United States Patent [19]

Nunzio et al.

[11] 4,005,280
[45] Jan. 25, 1977

[54] TICKET READER

[75] Inventors: Napoleone Nunzio, Worcester; Donald James Musgrave, Woodville, both of Mass.

[73] Assignee: Dennison Manufacturing Company, Framingham, Mass.

[22] Filed: Apr. 10, 1975

[21] Appl. No.: 566,735

[52] U.S. Cl. .................................. 235/61.11 R
[51] Int. Cl.² .................................. G06K 13/08
[58] Field of Search .......... 235/61.11 D, 61.11 R, 235/61.11 A, 61.11 C; 360/97

[56] References Cited

UNITED STATES PATENTS

| | | | |
|---|---|---|---|
| 3,581,064 | 5/1971 | Palmer | 235/61.11 D |
| 3,665,119 | 5/1972 | Palmer | 235/61.11 D |
| 3,783,249 | 1/1974 | Wiegand | 235/61.11 D |
| 3,787,661 | 1/1974 | Moorman et al. | 235/61.11 D |

*Primary Examiner*—Daryl W. Cook
*Attorney, Agent, or Firm*—George E. Kersey

[57] ABSTRACT

A foolproof, electromechanical-logic, ticket reading/writing apparatus for data collection system with magnetically encoded tickets comprises one or more magnetic transducers, a self-aligning ticket entry means, a pivotal platform movable between loading and read/write positions and a motor driven capture and eject mechanism. The tickets are either automatically ejected by the motor after reading/writing or manually releasable if not capable of reading/writing or eject. The ticket is maintained in effective, reliable reading contact with the transducer(s) during reading/writing.

13 Claims, 4 Drawing Figures

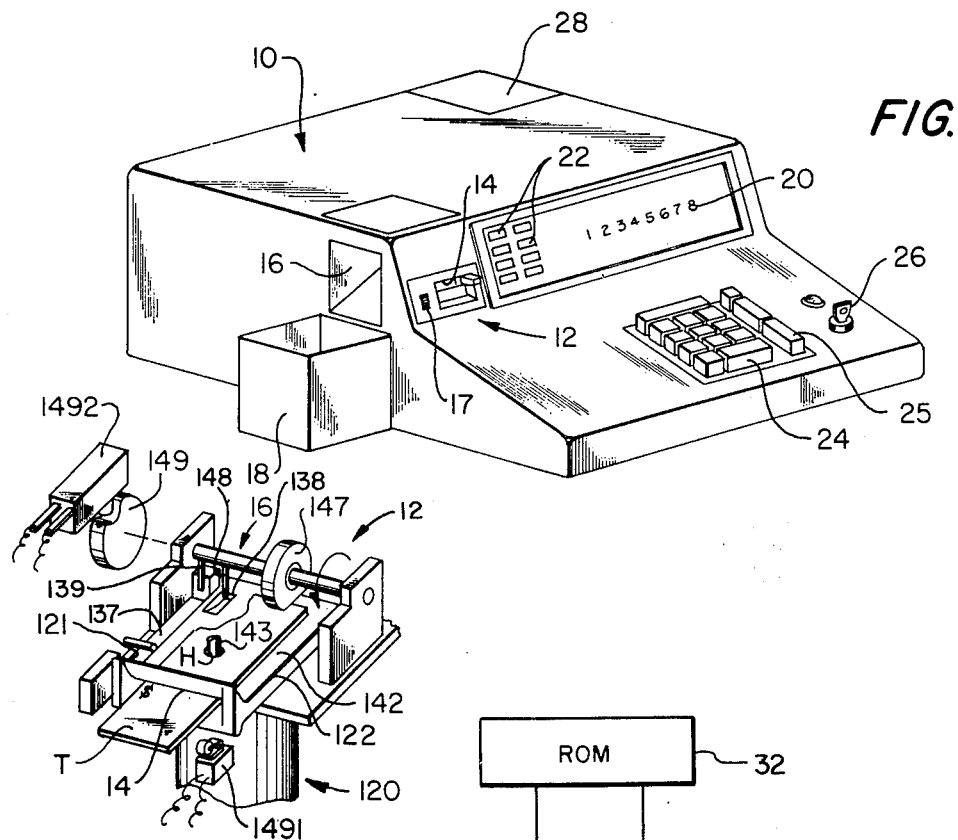
FIG. 1
FIG. 1A
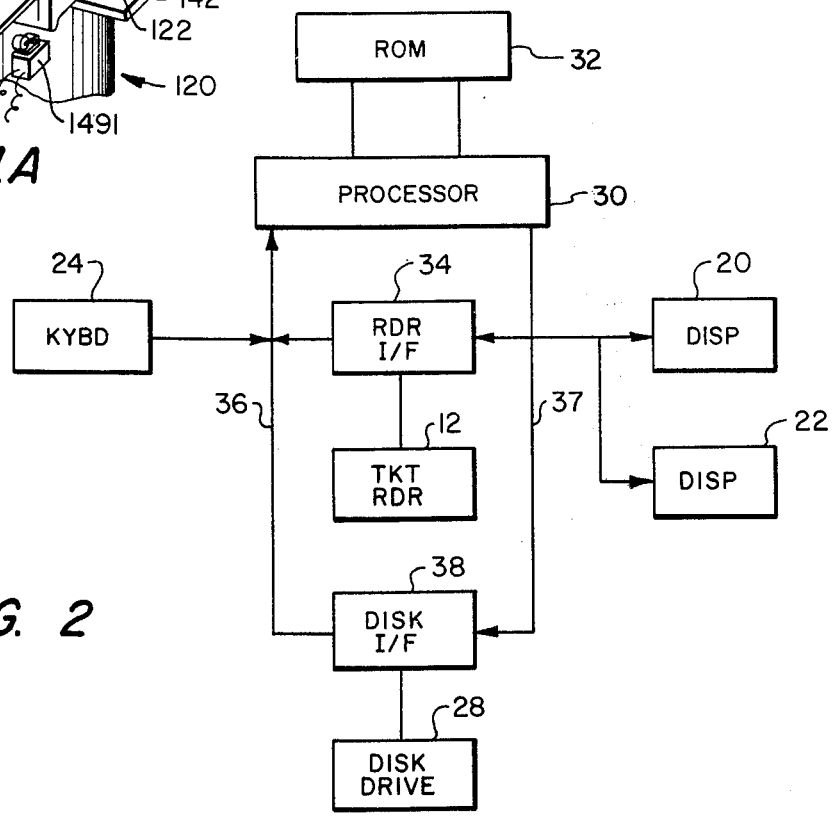
FIG. 2

TICKET READER

BACKGROUND OF THE INVENTION

The present invention relates to data collection for distribution control, more particularly in connection with wholesale/retail distribution of goods or like distribution control functions as adumbrated below, and provides substantial improvement in efficiency of data collection together with reduction of cost and time for associated data processing through maintenance of data collection events at decentralized locations in the first practical and economic fashion consistent with high volume and variety of data collection requirements.

Some retail merchandise data control systems include use of magnetic oxide coated (or otherwise suited to be encoded, e.g. by hole punching or marking with OCR readable notation) tickets tied to or associated with each piece of goods and encoded with pricing and inventory control data. A batch reader such as the commercially available MTR 200 reader may be used to retrieve data such as price and identification and inventory control numbers from a periodic accumulation of tickets and to store such information per se and/or aggregate totals. The equipment also reformats the data for use in EDP systems. Such equipment includes a minicomputer which provides operation control through preprogrammed commands or in response to commands in conversational mode entered through input/output terminal. The terminal is also utilized to display system status information for flash reports. The system may also include a re-mark terminal (e.g. for entry of price change information on the oxide coating). A tape or disk (or other data storage medium) data store sequentially records the information accumulated from ticket reading. This state of the art is further disclosed in the prior U.S. patents of common assignment herewith, Nos. 3,103,666, 3,517,612, 3,553,440, 3,626,462, 3,662,362, 3,689,065, 3,715,745, 3,727,031, 3,761,687, 3,774,904, 3,841,624, 3,742,844, 3,771,670, 3,797,386, 3,804,007, 3,806,715, relating to tickets and their marking and reading for distribution control and the like.

It is an important object of the invention to provide interactive operation of systems of the class described easily mastered by relatively unskilled operators.

It is a further object of the invention to provide multi-ticket processing at high rates of tickets per hour consistent with the preceding object.

It is a further object of the invention to allow defective or unreadable ticket removal consistent with one or more of the preceding objects.

SUMMARY OF THE INVENTION

According to the present invention, tickets are processable at high rates, consistent with operational flexibility, by high speed transducer means and a high speed semi-automatic ticket reader. The tickets are fed singly to a supporting carrier containing a flexible guide (e.g. a spring loaded pin) which yields until it can engage a ticket locating means (e.g. a hole or notch in the ticket). After properly locating the ticket on the carrier, the carrier is moved to place the ticket into operative relationship with the transducer(s) for reading and/or writing on the encoding portion of the ticket. The ticket and transducer and relatively scanned to serially expose the whole length of one or more data tracks of the ticket to the transducer(s). Then upon automatic recognition of completion of reading, the device is programmed to prompt entry of data read and to automatically move the carrier so that the ticket is out of operative relationship with the transducer(s). The carrier moves to a ticket eject position, preferably coincident with the ticket load position. There, the ticket is automatically captured and ejected while the operator is loading the next ticket. The automatic capture and eject mechanism preferably comprises a friction wheel driven by a motor which may be started and stopped or clutched and declutched for control.

These and other objects, features and advantages of the invention will be more clearly understood from the following detailed description of preferred embodiments, taken in connection with the accompanying drawings, in which:

BRIEF DESCRIPTION OF THE DRAWING

FIG. 1 is an isometric view of the data collection apparatus in accordance with a preferred embodiment of the invention and FIG. 1A is an expanded isometric view of a ticket reader subassembly of the apparatus;

FIG. 2 is a block diagram of system architecture for said apparatus;

DETAILED DESCRIPTION OF PREFERRED EMBODIMENTS

Figure 3:
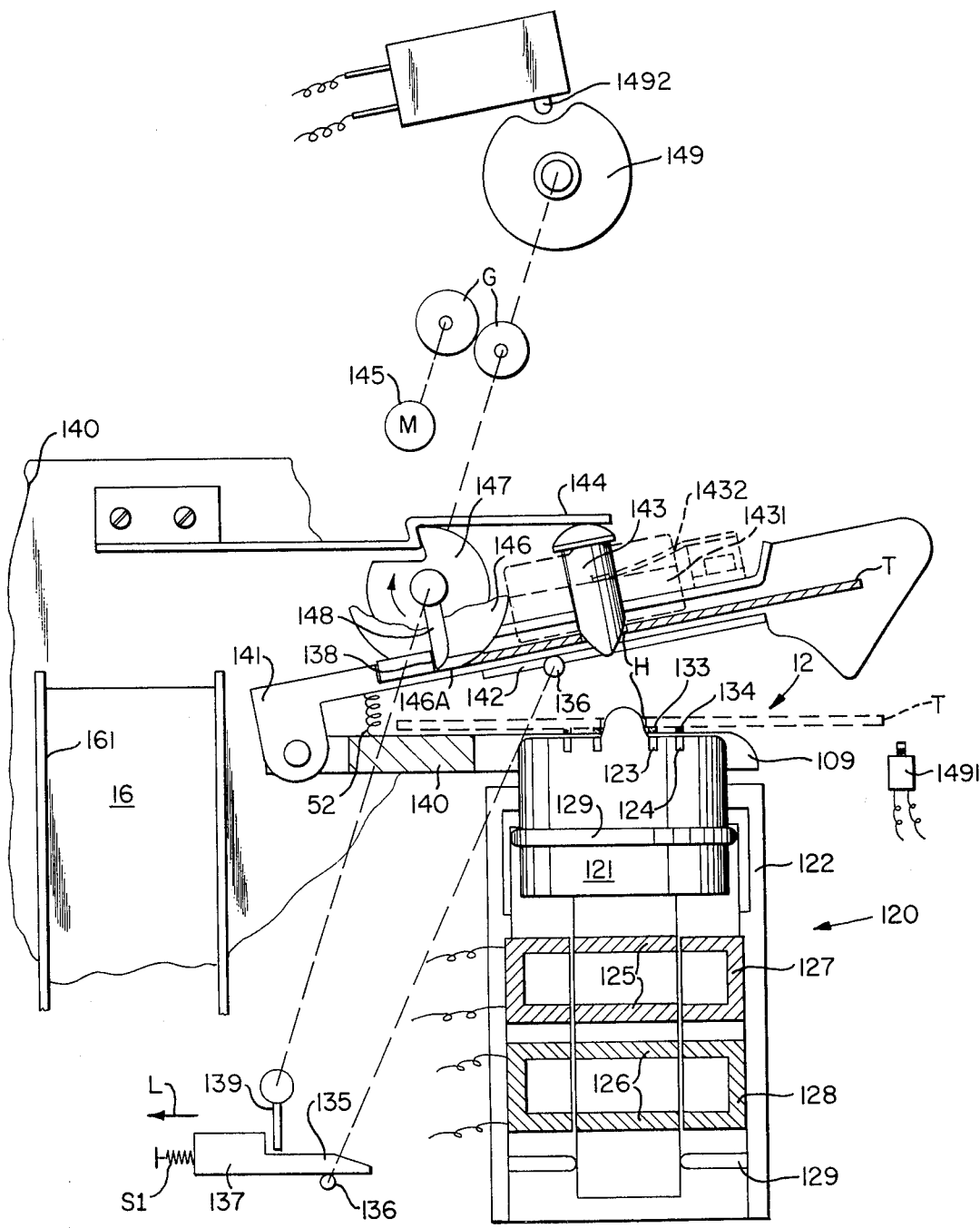
FIG. 3 is a sectioned elevation view, partly schematic of the ticket reading and writing component of said apparatus.

Referring now to FIG. 1, there is show a data collecting console 10 comprising the ticket reading and writing section 12 with a ticket entrance 14 and a ticket exit 16, discharging tickets into a collection box 18. A front face of the console comprises a numerical display 20 and a function prompting display 22, comprising panels with alphanumeric information which may be back lighted. The numeric display may comprise solid state diode indicators. The apparatus further comprises a keyboard 24 for punching in numeric information and for function selection information and a lock 26. A portion 28 of the console houses a data storage medium such as a tape belt or disc, preferably a flexible disc known in the art as a "diskette". A drive for the diskette is contained in section 28.

FIG. 1A is an isometric blow-up of the reader 12 showing an inserted ticket T with the visual price field ($) visible for reading by the operator for comparison with price information displayed at 20. The ticket is inserted through opening 14 onto a pivotal platform 142 and is aligned by sidewall guides 121 and 122 so that a hole H in the ticket can be engaged by a spring loaded pin 143. After reading/writing processing, a motor driven wheel 147 is automatically activated to engage the ticket and drag it by friction to the exit 16 for ejection.

The ticket may be of the type described in U.S. Pat. No. 3,727,031 and comprises a magnetic coating on its lower surface and visible information on its upper surface.

During the reading/writing the ticket is flattened out by a spring loaded upper anvil thereon (not shown) which may be released manually to withdraw a defective ticket through opening 14.

A transducer with associated rotary transformer is indicated at 120.

Referring now to FIG. 2 system architecture of the apparatus comprises the above-mentioned keyboard 24, displays and 22, ticket reader 12 and a disc drive at 28. These are linked to microcomputer central processing unit 30 and read-only-memory via an input buss 36 and output buss 37 and appropriate interfaces indicated at 34 and 38.

The microcomputer preferably comprises the commercially available MCS-4 micro processor of Intel Corporation. The input buss line contains 4 bits of data lines, an input strobing line and a test line and device select lines. The output buss contains 4 bits of data lines, an output strobing line and device select lines. The C.P.U. and ROM may be interfaced via standard interface chips normally associated with the micro processor (but not shown here). The C.P.U. includes a two-phase clock generating a clock frequency of 750 kiloherz.

Referring now to FIG. 3, the ticket reader/writer is shown in further detail. It comprises a rotating magnetic head 121 interacting with a cylindrical stator body 122 and with the magnetically encoded data on tickets to be read or written. The rotor head comprises two concentric annular tracks 123 and 124 interconnected within the rotor to annular tracks 125 and 126, respectively, which interact with annular tracks 127 and 128, respectively, on the stator to define two rotary transformers. The rotor is mounted for high speed rotation via bearings 129. Tickets T with central holes H and circular magnetic tracks surrounding the hole on a bottom face are inserted one by one into the unit. The information track coatings on the ticket are indicated at 133 and 134 and they line up with rotary magnetic heads 123 and 124. Each of the tracks 123 and 124 contain gaps for reading and writing. Electrical output connections to the data processing means described below in connection with program controls, determine when head 121 is reading or writing and the ticket tracks involved.

The tickets are initially inserted into a pivotable ticket holder 141 which is pivotably mounted from fixed structure 140 of the apparatus and contains a ticket holding platform 142 and a locating pin 143 which is biased downwardly towards the ticket by a leaf spring 144. The inserted ticket raises the pin 143 against the spring action until hole H is found to allow pin 143 to drop and assure perfect location. Sidewalls (not shown) on unit 141 guide the ticket to avoid excessive hunting.

A motor 145 mounted on the fixed structure drives a capture wheel 146 which has an arc cut away to define a face 146A that can allow passage of the ticket thereunder for capture. The same motor drives a cam 147 which lifts the spring 144 during the ticket removal explained below and also drives a cam 149 for activating a microswitch. Once the ticket has been located through the use of pin 143, the pivotal unit 141 is lowered, pivoting it clockwise about its axis to bring the ticket into the position shown in phantom lines in FIG. 3. Magnetic reading and writing functions are accomplished and then, either on keyed-in command or automatically via the program, motor 145 is activated to drive wheel 146 through a single turn moving ticket T into exit slot 16 where it strikes a wall 161 and goes through a right angle turn to emerge into the collection box (see FIG. 1).

A stop pin 148 is also mounted for the common shaft to stop the common shaft at the completion of a single turn. At this same instant, cam 149 is positioned as shown in FIG. 3 with respect to the micro switch causing motor 145 to de-energize. This action causes the common shaft to attempt a reverse direction (backlash) but this is overcome by the restriction caused by spring 144 against cam 147 which is mounted from the common shaft. The mechanism is now ready to accept another ticket.

A latching face 138 of the platform engages pin 148 to effect stopping when platform 142 is up. When the platform is lowered the pin can clear the face and rotate through one revolution during which time the latching face comes up. A further pin 139 pushes latch key 137 back as indicated by arrow L against the action of compressive spring 51 to release pin 136 which is attached to platform 142 at the beginning of shaft motion. This allows latch face 138 to come up to engage pin 148 to stop the shaft after one revolution.

Platform 142 is spring biased upwardly by one or more springs 52. Lowering platform 142 brings the pin 136 thereon into engagement with the ramp face 135 of latch 137 and pin 136 is locked under latching 137 until released thereby holding down platform 142.

An anvil block 1431 is mounted on platform 142 and is biased downwardly by a yoke form leaf spring 1432 to flatten ticket T and assure uniform spacing of tracks 133 and 134 thereon from the magnetic gap(s) of the reading/writing head.

A microswitch 1491 senses platform lowering and microswitch 1492 operated by cam 149, described above, senses the one shaft revolution incident to motor controlled platform raising (i.e. by releasing latch key 137).

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A ticket reader comprising
a carrier that is movable between loading, reading and eject positions;
means for locating a ticket on said carrier;
means for reading information encoded on said ticket and converting it to output signals when the carrier is in said reading position;
means for locking the carrier in said reading position and biasing it for movement to the eject position when the lock is released; and
means for ejecting the ticket from the carrier, said eject position coinciding with said loading position and said carrier being pivotal from said reading position to said eject position.

2. A ticket reader comprising
a carrier that is movable between loading, reading and eject positions;
means for locating a ticket on said carrier;
means for reading information encoded on said ticket and converting it to output signals when the carrier is in said reading position;
means for locking the carrier in said reading position and biasing it for movement to the eject position when the lock is released; and means for releasing said lock and ejecting said ticket from said carrier.

3. A ticket reader comprising a carrier that is movable between loading, reading and eject positions;
   means comprising a spring loaded detent associated with said carrier and engageable with an opening in said ticket to fix its location on said carrier;
   means for reading information encoded on said ticket and converting it to output signals when the carrier is in said reading position;
   means for locking the carrier in said reading position and biasing it for movement to a ticket eject position when the lock is released; and
   means for ejecting said ticket from said carrier.

4. Ticket reader in accordance with claim 3 in combination with means defining a transducer and having a locating pin engageable with said ticket when the carrier is in said read position.

5. Ticket reader in accordance with claim 4 and further comprising,
   means defining a spring biased anvil bearing on a back face of the ticket away from the transducer so that the spacing of a forward face of the ticket from the transducer is uniformly close.

6. Ticket reader in accordance with claim 4 wherein said transducer comprises at least one rotating magnetic head with contactless coupling to electrical output signal processing means via a rotary transformer and means for driving the head.

7. A ticket reader comprising
   a carrier that is movable between loading, reading and eject positions;
   means for locating a ticket on said carrier;
   means for reading information encoded on said ticket and converting it to output signals when the carrier is in said reading position;
   means for locking the carrier in said reading position and biasing it for movement to the eject position when the lock is released; and
   means for ejecting the ticket from the carrier including a drive motor with a ticket capturing device mounted thereon.

8. Ticket reader in accordance with claim 7 wherein said ticket capture device is a friction wheel.

9. Ticket reader in accordance with claim 8 wherein said friction wheel is profiled to clear the ticket when loading and engage the ticket when ejecting,
   the shaft being driven solely during the eject phase and only when the carrier is in said eject position.

10. Ticket reader in accordance with claim 7 wherein said eject means further comprise a detent for engaging the shaft to stop its motion after one cycle, by engaging the carrier in eject position and means for automatically terminating shaft drive at the same time.

11. Ticket reader in accordance with claim 10 and further comprising,
    spring-loaded means engaging said shaft to prevent backlash.

12. A ticket reader comprising a carrier that is movable between loading, reading and eject positions;
    means for locating a ticket on said carrier;
    means for reading information encoded on said ticket and converting it to output signals when the carrier is in said reading position;
    means for locking the carrier in said reading position and biasing it for movement to the ticket eject position when the lock is released; and
    means for ejecting the ticket from the carrier;
    said carrier being arranged to maintain said ticket entirely visible to an operator during the loading and locating thereof.

13. A data reader comprising
    a carrier that is pivotally movable between two positions;
    means for locating a data card on said carrier;
    means for reading data from said card at a first position;
    means for pivoting said carrier from said first position to a second position and releasing said data card; and
    means for ejecting said data card from said carrier.

* * * * *